W. J. BLOOMFIELD.
BEAN CLEANER.
APPLICATION FILED JULY 15, 1912.
1,039,249.
Patented Sept. 24, 1912.
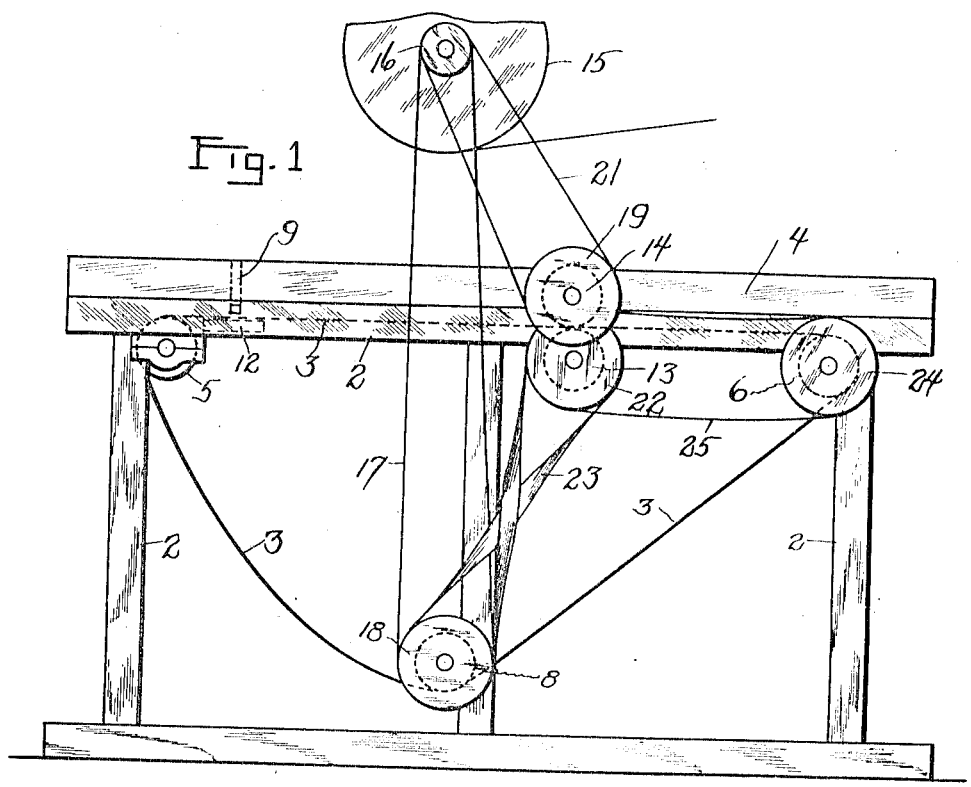
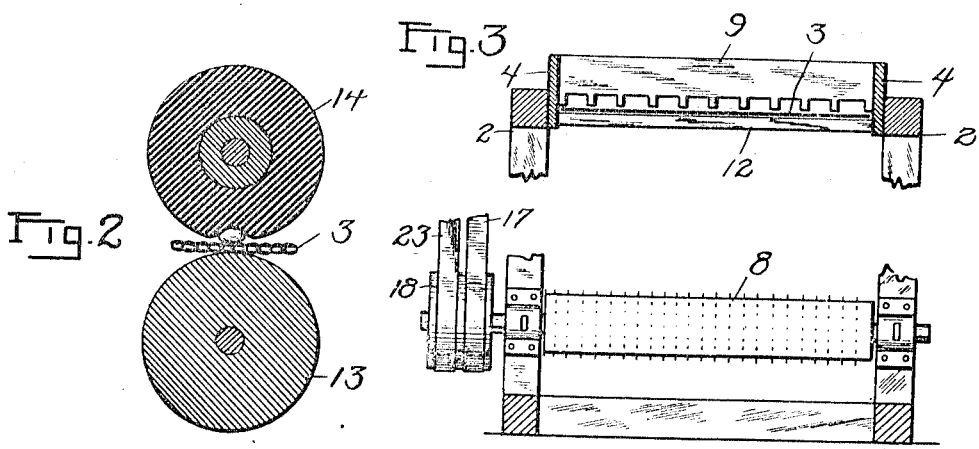
WITNESSES
INVENTOR
Wm J. BLOOMFIELD
BY Miller White
his ATTORNEYS

UNITED STATES PATENT OFFICE.

WILLIAM J. BLOOMFIELD, OF ANTIOCH, CALIFORNIA.

BEAN-CLEANER.

1,039,249.

Specification of Letters Patent. Patented Sept. 24, 1912.

Application filed July 15, 1912. Serial No. 709,434.

*To all whom it may concern:*

Be it known that I, WILLIAM J. BLOOMFIELD, a citizen of the United States, and a resident of Antioch, Contra Costa county, State of California, have invented new and useful Improvements in Bean-Cleaners, of which the following is a specification.

The invention relates to bean cleaners which are adapted to remove the lumps of earth and adobe which are present among the beans after they have been harvested.

The object of the invention is to provide a simple, durable machine which will readily remove all lumps of earth and adobe from the beans.

After the beans have been harvested and threshed, they must be cleaned before they are ready for the market. A certain amount of earth and adobe is mixed with the beans, and it is the object of the present invention to remove this foreign material cheaply and quickly without injuring the beans.

The particular advantages of the invention will be set forth at length in the following description where I shall outline in full that form of the invention selected for illustration in the drawings accompanying and forming part of the present invention.

Referring to said drawings: Figure 1 is a side elevation of the bean cleaner of my invention. Fig. 2 is a detail showing the screen and pressure rollers in section. Fig. 3 is a detail of the distributer. Fig. 4 is a detail of the driving and cleaning roll for the screen.

The apparatus of my invention consists of a suitable frame or structure 2 upon which is arranged an endless traveling screen 3. The screen travels longitudinally of the frame between the side-walls 4, thereby forming a trough, of which the movable screen is the bottom. The screen passes over the rollers 5—6, arranged at opposite ends of the trough, and under the pin roller 8 arranged below the trough. Arranged above the screen, between the side-walls 4 and adjacent the receiving end of the screen, is a spreader 9, which operates to spread the beans so that only a single layer of beans occur on the screen. Below the spreader 9 is a support 12 over which the screen travels and which operates to hold the screen within a fixed distance to the spreader, thereby preventing the screen from sagging at that point, and allowing an excess number of beans to pass.

The screen is formed of spiral wire fabric in which the spirals have considerable lateral play, so that the size of the interstices vary. When the screen is in tension, the interstices are of maximum area, but when the screen is slack the spirals lie closer together, reducing the size of the interstices. The movement of the slack screen causes a movement of the spirals with respect to each other. The rollers 6 and 8 are power driven so that the screen is in tension between rollers 5 and 6 and 6 and 8, and is slack between rollers 8 and 5.

Arranged below and in contact with the screen intermediate between rollers 5 and 6 is a non-compressible roller 13 preferably formed of wood, and extending for the width of the screen. Directly above the screen and alined with the roller 13 is a compressible roller 14, preferably formed of comparatively soft rubber. This roller is arranged between the side walls 4 and is coextensive with roller 13.

In the machine illustrated in the drawings, power is applied from the pulley 15 through the medium of the pulley 16. The pin roller 8 is driven from pulley 16 through the medium of the belt 17 and pulley 18. The shaft of the compressible roller 14 is provided with a pulley 19 which is connected to pulley 16 by the belt 21. The roller 13 is driven from pulley 18 through the medium of pulley 22 and belt 23, and roller 6 is driven from pulley 22 through the medium of the pulley 24 and belt 25. The diameters of the pulleys and rollers is such that they all travel at the same speed, so that the screen is properly held in tension, and so that the rollers 13 and 14 do not tend to advance or retard the screen.

The operation of the apparatus is as follows: The beans, intermixed with the lumps of earth and adobe, are fed onto the moving screen in advance of the spreader 9, which distributes them evenly over the surface of the screen in a single layer. In passing under the roller 14, the beans are pressed into the roller and pass uninjured, while the lumps of earth and adobe, which are more brittle than the beans, are broken by being forced into or through the screen. The beans are discharged from the screen as it passes over roller 6. That portion of the earth or adobe which has been broken into sufficiently small parts, falls through the screen, but a certain portion of the lumps are held in the screen. These lumps are mostly dislodged by the pins in roller 8, which engage in the interstices of the screen as it passes over the roller. The remaining lumps are dislodged from the screen during its period of slack in moving upward to roller 5. The spirals which form the screen move relatively to each other during this slack period, thereby grinding and dislodging any lumps which may remain. It is understood, of course, that the interstices in the screen are of such size that the beans will not fall through. The resiliency or compressibility of the roller 14 is such that it readily yields to allow the beans to pass, but readily crushes the lumps of earth which are more brittle and friable than the beans.

I claim:

1. In a bean cleaner, the combination of an endless traveling screen, a yielding surface roller in operative relation with said screen and means for driving said screen.

2. In a bean cleaner, the combination of an endless traveling screen of spiral wire fabric, a yielding surface roller arranged above said screen and a support below said screen in line with said roller.

3. In a bean cleaner, the combination of an endless traveling screen of spiral wire fabric, a yielding surface roller arranged above and in proximity to said screen and a hard surface roller arranged below and in contact with said screen in line with said yielding surface roller.

4. In a bean cleaner, the combination of an endless traveling screen of spiral wire fabric, a yielding surface roller arranged above and in close proximity to said screen, a hard roller arranged below and in contact with said screen in line with said yielding surface roller, and a pin roller engaging said screen.

5. In a bean cleaner, the combination of an endless traveling screen of spiral wire fabric, a yielding surface roller arranged above said screen, a hard roller arranged below said screen in line with said yielding surface roller, and means for driving said screen and said rollers.

6. In a bean cleaner, the combination of a screen of spiral wire fabric, a yielding surface roller arranged above said screen, a support below said screen in line with said roller, and a pin roller engaging said screen.

7. In a bean cleaner, the combination of an endless traveling screen of spiral wire fabric, a spreader arranged above said screen, a yielding surface roller arranged above said screen, and a hard roller arranged in contact with said screen below and in line with said yielding surface roller.

8. In a bean cleaner, the combination of an endless traveling screen of spiral wire fabric, a yielding surface roller arranged above said screen, a support below said screen and in line with said roller, and means for driving said screen so that a portion thereof is slack.

9. In a bean cleaner, the combination of an endless traveling screen of spiral wire fabric, a spreader arranged above said screen, a yielding surface roller arranged above and in close proximity to said screen, a support below said screen in line with said roller, a pin roller engaging said screen and means for driving said screen, a portion of the screen being slack.

In testimony whereof, I have hereunto set my hand at Antioch, Contra Costa county, California, this fifth day of July 1912.

WILLIAM J. BLOOMFIELD.

In presence of—
BERNARD REILLY,
RALPH HARRISON.